United States Patent [19]

Shoap et al.

[11] Patent Number: 5,661,492
[45] Date of Patent: Aug. 26, 1997

[54] PERSONAL ALARM LOCATION SYSTEM AND METHOD

[75] Inventors: Stephen Davis Shoap, Scottsdale; William John Baumann, Tempe, both of Ariz.

[73] Assignee: Motorola, Inc., Schaumburg, Ill.

[21] Appl. No.: 189,383

[22] Filed: Jan. 31, 1994

[51] Int. Cl.$^6$ .................................................. G01S 3/02
[52] U.S. Cl. ...................... 342/465; 342/457; 342/463; 340/502
[58] Field of Search .......................... 342/463, 457, 342/465, 464, 417; 340/693, 502, 504

[56] References Cited

U.S. PATENT DOCUMENTS

| | | | |
|---|---|---|---|
| 4,176,254 | 11/1979 | Tuttle et al. | 179/5 R |
| 4,222,052 | 9/1980 | Dunn | 343/112 R |
| 4,494,119 | 1/1985 | Wimbush | 343/457 |
| 4,510,350 | 4/1985 | Wagner | 179/5 P |
| 4,524,243 | 6/1985 | Shapiro | 179/5 R |
| 4,596,988 | 6/1986 | Wanka | 343/457 |
| 4,698,781 | 10/1987 | Cockerell | 364/561 |
| 4,908,629 | 3/1990 | Apsell et al. | 342/457 |
| 5,055,851 | 10/1991 | Sheffer | 342/457 |
| 5,075,671 | 12/1991 | Livingston, III | 340/574 |
| 5,208,756 | 5/1993 | Song | 364/449 |
| 5,309,144 | 5/1994 | Lacombe et al. | 340/359 |
| 5,311,197 | 5/1994 | Sorden et al. | 342/457 |

OTHER PUBLICATIONS

An article entitled "Implementation of GEOSTAR® RDSS Spectrum Receiver" by Masoud Motamedi & Robert D. Briskman from Geostar Corporation, IEEE, 1987.

*Primary Examiner*—Thomas H. Tarcza
*Assistant Examiner*—Dao L. Phan
*Attorney, Agent, or Firm*—Frederick M. Fliegel

[57] ABSTRACT

A population of locatable personal detection units (PDUs) (20) are worn by users. Any number of locators (14) are placed at known locations within an area (10) where the users tend to be. When an alarm event for an individual user occurs, a request signal is transmitted from the user's PDU (20). The request signal is received at several of the locators (14), each of which measure the power level of the request signal. A central computer (16) selects some of these locators (14) in response to the power level measurements. In sequence, the selected locators (14) transmit an interrogation signal to the PDU (20), the PDU (20) replies to the interrogation signal, and the locators (14) measure the duration transpiring between the interrogation and the reply. Based on the durations measured for at least three of the locators, the central computer (16) uses a multilateration process to localize the PDU (20).

30 Claims, 7 Drawing Sheets

PERSONAL ALARM LOCATION SYSTEM AND METHOD

TECHNICAL FIELD OF THE INVENTION

The present invention relates generally to personal alarm systems and more specifically to personal alarm systems which locate users within a wide area.

BACKGROUND OF THE INVENTION

Personal alarm systems incorporate transmitters worn by users. The transmitters include a trigger mechanism that the user may activate, either intentionally, unintentionally, consciously or unconsciously, to broadcast an alarm signal that may be received by a receiver. The receiver then annunciates the alarm so that an appropriate response may be made.

One class of alarm system broadcasts alarm signals through the use of ultrasonic or infrared signals. Such systems are advantageous because ultrasonic and infrared signal receivers will detect alarm signals transmitted from only a small distance. Thus, in a building, one receiver may be placed in each room of interest, and an alarm signal may be easily localized by identifying the particular receiver detecting the alarm signal. The number of receivers required for wide area detection makes the system unacceptably costly. Ultrasonic signal receivers are unacceptably prone to false alarms while infrared signal receivers are unacceptably prone to failures in detecting valid alarm signals.

Radio frequency (RF) location systems are also known, which rely upon RF signals to localize a locatable unit through the use of such techniques as multilateration, triangulation etc. RF signals travel at the speed of light and often travel in poorly controlled directions depending on antenna patterns, reflections etc. RF signals are typically used in location systems operating over large distances so that the problems of interference, multipath and false alarms are mitigated.

When conventional RF location systems use multilateration to localize a locatable unit, they require precise synchronization between locator units so that precise timing measurements may be made for RF signals propagating between the locatable and locator units, typically requiring a complex and dedicated communication network among the locator units. Unfortunately, many applications that might benefit from the use of an RF personal alarm and location system cannot support the installation expense of such a communication network.

SUMMARY OF THE INVENTION

The advantages of the present invention are carried out by a personal alarm location system and method therefor. The system includes a plurality of locator units positioned at fixed positions and having a population of locatable units. The system locates one of the locatable units by transmitting a request signal from the one locatable unit. The request signal is received at a first group of the plurality of locator units. A power level for the request signal is measured at each of the first group of locator units and a subset thereof is selected in response to the power level measurements. The selected subset of locator units is then activated to determine a position for the locatable unit.

BRIEF DESCRIPTION OF THE DRAWINGS

A more complete understanding of the present invention may be derived by referring to the detailed description and claims when considered in connection with the Figures, wherein like reference characters refer to similar items throughout the Figures, and:

DETAILED DESCRIPTION OF THE PREFERRED EMBODIMENTS

Figure 1:
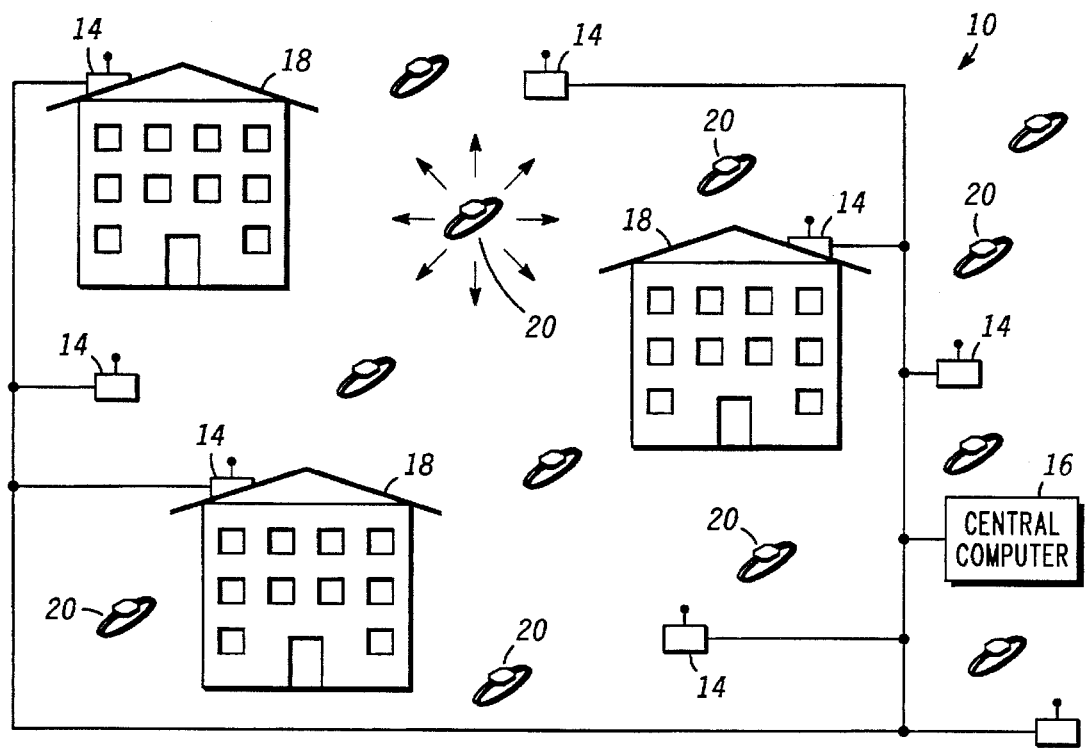
FIG. 1 is a layout diagram of an environment within which the present invention may be practiced at an instant when an alarm situation is initiated.

FIG. 1 is a layout diagram of an area 10 within which personal alarm location system 12 operates. Area 10 may cover a college, university, hospital, corporate, prison or government campus. System 12 includes any number of outside locator transceiver units ("1locators") 14. Each of locators 14 communicates with central computer 16 through any conventional data communication network, e.g., through radio frequency (RF) signals, dedicated communication cables, telephone lines, power lines etc.

Locators 14 are distributed throughout area 10. Desirably, some of locators 14 are placed at ground level while others are elevated, e.g., upon buildings 18, poles or towers (not shown). Locators 14 are placed at fixed positions, i.e., the precise locations of locators 14 are known to central computer 16, and these locations do not substantially change without this knowledge being updated.

System 12 additionally includes a population of locatable personal detection units (PDUs) 20. Desirably, PDUs 20 are configured to resemble watches, pagers or other items of apparel conveniently worn by users. PDUs 20 may provide the functionality of a watch or pager in addition to personal alarm location system functionality. PDUs 20 freely move about within area 10 and may also enter and leave area 10, but the alarm and location services provided by system 12 are not provided when PDUs 20 travel beyond the range of locators 14.

When a PDU 20 detects an alarm event, it broadcasts an RF request signal. The alarm event may occur when a user presses a button on PDU 20. Different situations may dictate different or additional alarm events. Medical applications may benefit from heart monitors or similar equipment (not shown) initiating an alarm event. Medical and prison applications may benefit from declaring an alarm event when a user falls down.

Some of locators 14 receive request signals broadcast by the alarming PDU 20. Not all of locators 14 are required to receive the request signal. Each locator 14 receiving the request signal measures the request signal's power level at the locator's location and forwards the power level to central computer 16.

Figure 2:
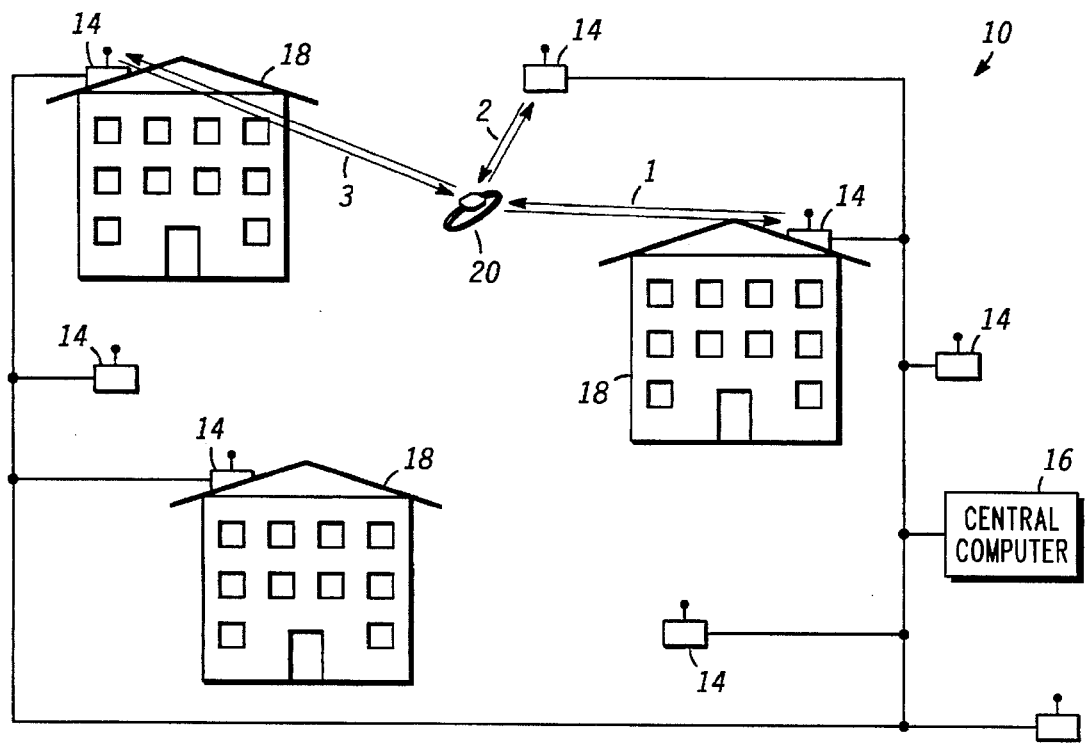
FIG. 2 is the layout diagram of FIG. 1 when an alarming locatable personal detection unit (PDU) is localized.

FIG. 2 is another layout diagram of area 10. Computer 16 selects a portion, desirably that portion detecting the greatest power levels, of the group of locators 14 that received the request signal. Computer 16 may additionally consider the geometrical layout of locators 14 in making its selection.

Computer 16 then instructs a first locator 14 to activate a location procedure. During this procedure, locator 14 transmits an RF interrogation signal to the alarming PDU 20, which responds to the interrogation signal by returning an RF reply signal. Locator 14 measures the duration between interrogation signal transmission and reply signal receipt. This duration is sent back to computer 16. Computer 16 repeats this process in sequence for at least second and third locators 14. Based upon the duration measurements obtained by selected locators 14, central computer 16 uses multilateration to localize the alarming PDU 20 and annunciates an alarm so that an appropriate response may be made. Since locators 14 operate sequentially under control of computer 16, locators 14 need not be synchronized with one another.

Figure 3:
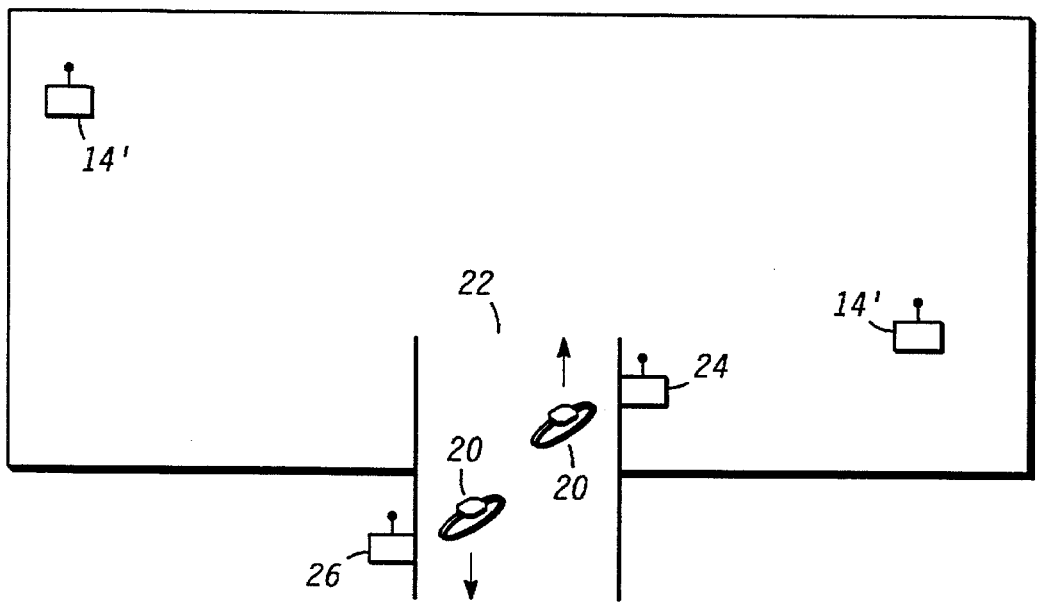
FIG. 3 is a layout diagram of one embodiment of the present invention with respect to a building.

FIG. 3 is a layout diagram of one embodiment of system 12 with respect to building 18. Inside locator units 14' are positioned on various floors of building 18. Desirably, at least one locator unit 14' resides on every floor or two of building 18. Inside locator units 14' are configured to at least receive request signals broadcast by PDUs 20. Inside locator units 14' may be used to localize an alarming PDU 20 within building 18.

Portal 22 is arranged so that PDUs 20 entering and exiting building 18 pass therethrough. Inner portal locator 24 and outer portal locator 26 reside proximate portal 22. Inner and outer portal locators 24, 26 are configured to at least transmit low power portal interrogation signals that PDUs 20 may detect when within portal 22. PDUs 20 may process these low power portal interrogation signals to determine whether the PDUs 20 are inside or outside a building. If PDUs 20 are inside building 18 having inside locator units 14', PDUs 20 desirably broadcast alarm signals at a lower power level than PDUs 20 use when outside building 18. The lower power level hampers the ability of the request signal to propagate between floors and outside building 18, improving the ability of system 12 to localize the PDU 20.

Portal interrogation signals are desirably coded with a specific ID of inner or outer portal locators 24, 26. Since locations of portal locators 24, 26 are known a priori, location of a PDU may be known in a building through interaction with a portal locator 24, 26 by storing identifying codes for inner and outer portal locators 24, 26 and use of the time sequence (i.e., direction of travel) of these two IDs to determine if the PDU is within or outside of building 18. A similar technique may be used to localize a PDU to a specific floor, room or area. Because portal locators 24, 26 correspond to definite, finite, known loci and having associated coverage areas of limited extent, they lend utility to infrared and/or ultrasonic interactions between PDUs 20 and portals 24, 26, either in lieu of or in addition to RF signal interchanges.

Figure 4:
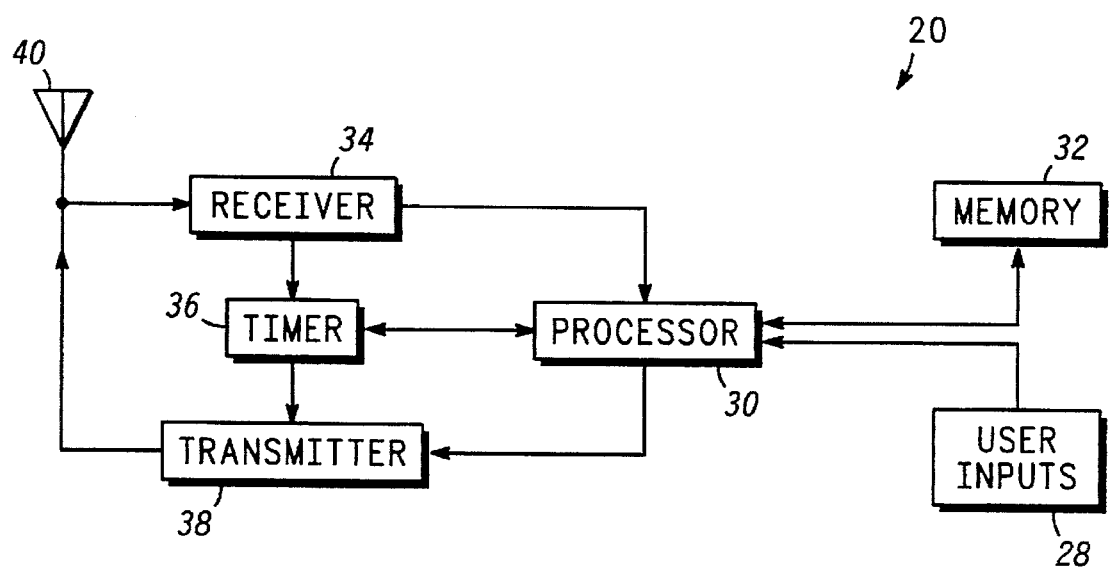
FIG. 4 is a block diagram of a PDU.

FIG. 4 is a block diagram of a PDU 20. User inputs 28 couple to processor 30 and may include a switch that a user manipulates to indicate an activation event to PDU 20. Processor 30 additionally couples to memory 32, receiver 34, timer circuit 36 and transmitter 38. Receiver 34 and transmitter 36 couple through an antenna switch (not shown) to antenna 40. Memory 32 stores programming instructions dictating PDU 20 operation, along with various constants, variables, tables etc. used therein.

Receiver 34 is compatible with interrogation signals transmitted by locators 14, 14', 24, 26 and has a trigger output coupled to timer 36 that automatically starts a counter or timer therein when an interrogation signal is received.

Transmitter 38 is compatible with complementary receivers in locators 14, 14', 24, 26, and has a trigger input coupled to timer 36, which provides a trigger signal to transmitter 38, initiating reply signal transmission at a predetermined constant delay following interrogation signal receipt. Since the time delay through PDU 20 may be unknown and may be variable from unit to unit, the predetermined constant delay is desirably set based on worst case delay with margin. Transmitter 38 may use spread spectrum techniques to further reduce multipath interference susceptibility of system 12 (FIG. 1). Spread spectrum request and reply signals may be detected in a locator 14, 14', 24 or 26 at a precise instant in time through well known correlation techniques. Spread spectrum transmission encoding is desirably programmable so that it may be omitted in specific situations, i.e., when PDU 20 is transmitting from inside building 18 (FIGS. 1, 3).

Figure 5:
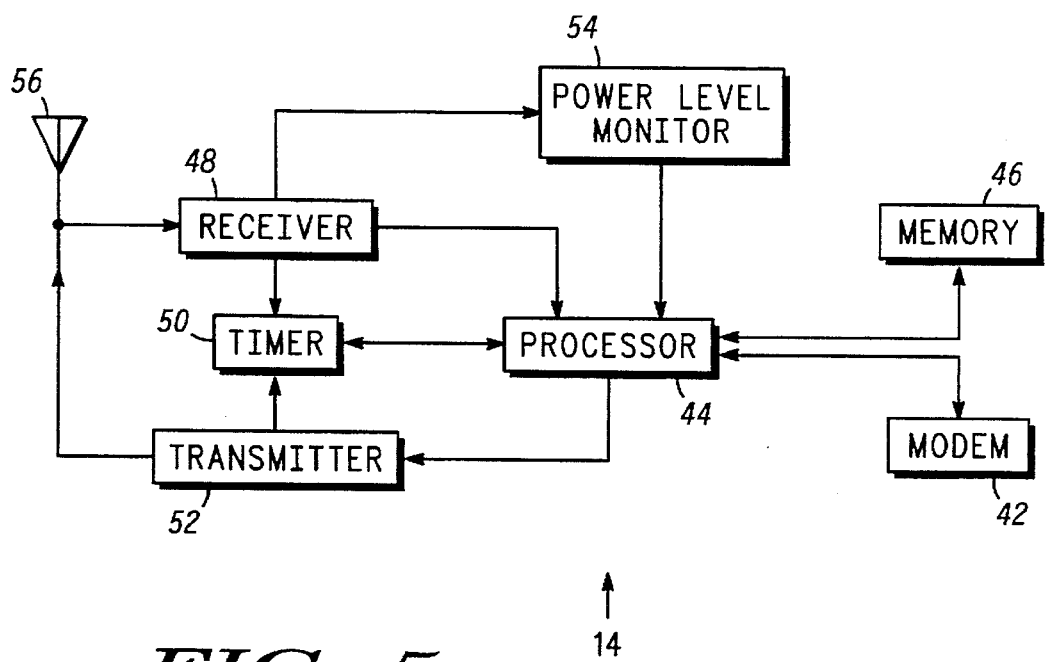
FIG. 5 is a block diagram of a locator unit.

FIG. 5 is a block diagram of locator 14. Modem 42 (or a similar device) couples to processor 44 and establishes and conducts data communications with central computer 16 (FIG. 1). Processor 44 additionally couples to memory 46, receiver 48, timer circuit 50, transmitter 52 and power level monitor circuit 54. Receiver 48 and transmitter 52 couple through an antenna switch (not shown) to antenna 56. Receiver 48 additionally couples to an input of power level monitor 54. Memory 46 stores programming instructions dictating operation of locator 14, along with various constants, variables, tables etc. used in operating locator 14.

Receiver 48 is compatible with the request and reply signals transmitted by transmitters 38 of PDUs 20 (FIG. 4). In addition, receiver 48 has a trigger output that couples to timer 50 and automatically stops a counter or timer therein when an reply signal is received. Receiver 48 desirably includes a correlation circuit (not shown) allowing receiver 48 to detect spread spectrum communications. The output signal from receiver 48 that couples to power level monitor 54 allows monitor 54 to measure and record the received signal power level.

Transmitter 52 is compatible with complementary receivers 34 in PDUs 20 (FIG. 4) and has a trigger output coupled to timer 50 for initiating a timer or counter therein for use in measuring the duration between the transmission of an interrogation signal and the receipt of a reply signal.

Inside locators 14' and portal locators 24, 26 (FIG. 3) may resemble simplified versions of locator 14. Inside locators 14' may omit timer 50 and transmitter 52 and may simplify receiver 48 by omitting a correlator and the capability to receive spread spectrum communications. Portal locators 24, 26 may omit receiver 48, timer 50, power level monitor 54 and modem 42. Accordingly, if these omissions are made, inside locators 14' and portal locators 24, 26 may be provided at less expense than locators 14. System 12 (FIG. 1) may include a few outside locators 14 together with many inside locators 14' and portal locators 24, 26 to provide a desirable degree of coverage and/or location resolution together with reduced system complexity.

Central computer 16 (FIG. 1) desirably resembles a conventional personal computer and may include a conventional assortment of hardware typically found in connection with personal computers, i.e., processors, memory devices, modems, keyboards and/or pointing devices, display units, printers etc.

Figure 6:
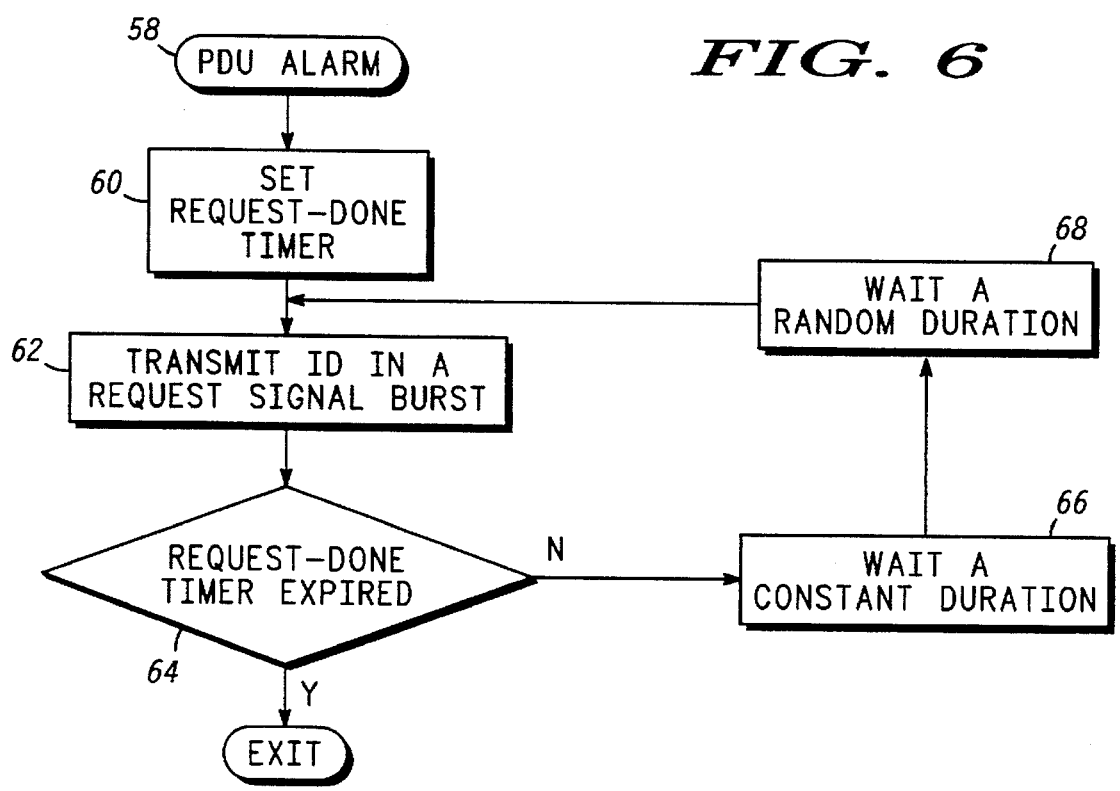
FIG. 6 is a flow chart of a PDU alarm procedure performed by the PDU illustrated in FIG. 4.

FIG. 6 is a flow chart of PDU alarm procedure 58 performed by PDU 20 when an alarm event occurs for PDU 20. An alarm event may occur when a user presses a button from user inputs 28 (FIG. 4) or when some other monitoring device initiates an alarm event and is typically a rare occurrence for any single PDU 20. Substantially all PDUs 20 desirably perform procedures similar to procedure 58 independently from one another.

Task 60 sets a request-done timer, desirably to a point a few seconds into the future, which defines when PDU 20 ceases transmitting its request signal. Task 62 then transmits a single request signal burst that makes up only a portion of the entire request signal. A single burst may last for up to a few hundred microseconds and conveys PDU identification (ID) data uniquely distinguishing the alarming PDU 20 from the population of PDUs 20 and type data which may indicate a type of alarm, particularly when PDUs 20 are capable of declaring different events as alarm events. Transmission occurs at a programmable power level and desirably with selectable (on/off) spread spectrum encoding. Power level and spread spectrum encoding selection may be determined during task 62 from program variables stored in memory 32 (FIG. 4). These variables are set in accordance with whether PDU 20 is inside or outside a building 18 (FIGS. 1, 3).

After task 62, procedure 58 performs query task 64 to determine whether the request-done timer has expired. When this timer expires, the request signal has completed its transmission and program control exits procedure 58. When this timer has not yet expired, task 66 causes PDU 20 to wait for a constant predetermined duration. Task 68 then desirably causes PDU 20 to wait for an additional random duration. Program control then returns to task 62.

PDU 20 transmits a request signal including a series of bursts, where each burst conveys at least a PDU ID and where the bursts are delayed from one another by a random duration. The delay between bursts saves power consumption in PDU 20 while improving chances of several locator units 14, 14' receiving at least a portion of the request signal. The random variation in delay between bursts reduces the chances of multiple PDUs 20 interfering with one another in situations where many PDUs 20 may be alarming at once. While precise values for random delays between bursts of the request signal are relatively unimportant to the present invention, delays in the ¾ to 1¼ second range would be acceptable.

Figure 7:
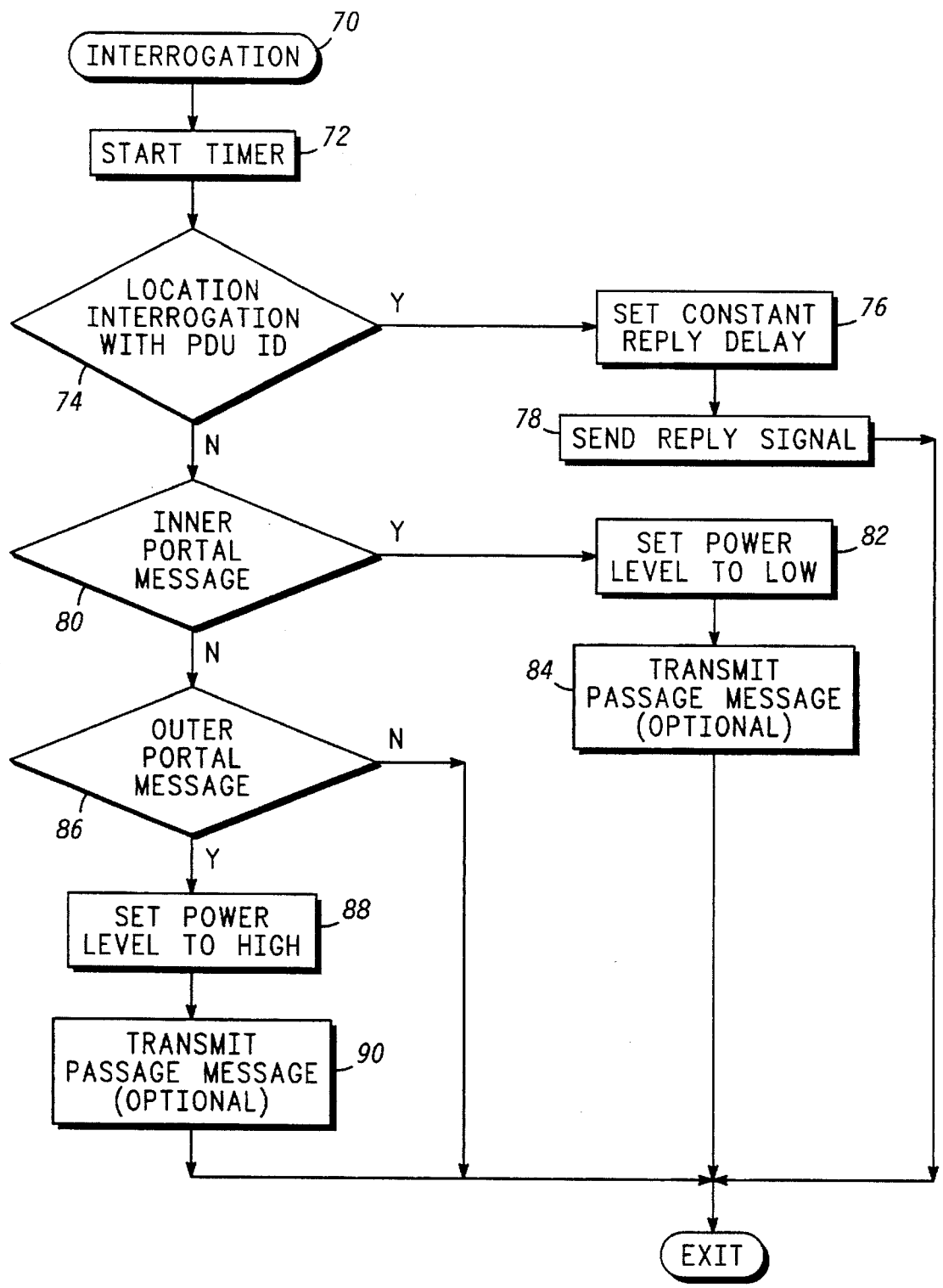
FIG. 7 is a flow chart of an interrogation procedure performed by the PDU illustrated in FIG. 4.

FIG. 7 is a flow chart of interrogation procedure 70, which is initiated and performed by performed by PDU 20 whenever it receives an interrogation signal. These signals may originate from locator 14 in order to localize the PDU 20, from portal locator 24, 26, or they may have another function not related to the present invention.

Procedure 70 performs task 72 to start timer 36 (FIG. 4), which may start automatically upon interrogation signal receipt. After task 72, query task 74 determines whether the interrogation signal represents a location interrogation directed to PDU 20 by examining data conveyed by the interrogation signal. If the data indicate the PDU's own ID, then the interrogation has been directed to the PDU. Handshaking via specific ID may not be required since the PDU will enter a different state, looking for a signal from a locator, following an alarm event.

When the interrogation is a location interrogation directed to the PDU 20, task 76 sets a constant reply delay (if necessary), representing an instruction to timer 36 (FIG. 4) to delay triggering transmitter 38 for a predetermined time following interrogation signal receipt. Task 78 sends the reply signal at the indicated time. Desirably, all PDUs 20 insert substantially the same constant delay between interrogation signal receipt and reply signal transmission. The reply signal is desirably sent at a high power level with spread spectrum encoding. Program control then exits interrogation procedure 70.

PDUs 20 may experience other types of interrogations than those used by locators 14 (FIG. 2) to localize PDU 20. For example, when task 74 determines that the interrogation is not a location interrogation directed to PDU 20, query task 80 determines whether the interrogation represents an inner portal message.

Inner and outer portal messages are continuously transmitted by inner and outer portal locators 24, 26, respectively (FIG. 3), desirably at a low power level so that PDUs 20 generally cannot receive them outside of portals 22. Inner and outer portal messages may be directed to any PDU 20 capable of receiving them. Thus, PDU 20 receives an inner portal message when it is moving through portal 22 (by inner portal locator 24) and task 82 then sets a variable instructing PDU 20 to transmit subsequent request signals in task 62 (FIG. 6) at a low power level and without spread spectrum encoding.

Optional task 84 may then be performed to transmit a passage message, desirably at a very low power level but in a manner allowing inner portal locator 24 to receive it. The passage message conveys the ID of PDU 20. Inner portal locator 24 may then send the message on to central computer 16 (FIG. 1) along with an ID for inner portal locator 24. Central computer 16 may keep track of the whereabouts of PDUs 20 as they enter and exit buildings 18 without PDUs 20 consuming excessive amounts of power in the process. Nothing requires portal locators 24, 26 to include receivers or PDUs 20 to perform task 84. After task 84, program control exits procedure 70. Alternatively, inner portal locator 24 may transmit a location ID to PDU 20. PDU 20 may store this ID and send the ID in high power mode to any locator 14, 14' as an indicator of the last known location of PDU 20.

When task 88 determines that an inner portal message has not been received at PDU 20, query task 86 determines whether an outer portal message (similar to inner portal messages except that they are transmitted from outer portal locators 26) has been received. When an outer portal message is detected, task 88 sets the power level variable to its high setting, and optional task 90 transmits a passage message that may be detected by outer portal locator 26. Tasks 88, 90 are similar to tasks 82, 84 (see supra). Program control then exits procedure 70.

Combining inner portal locator 24 in series with outer portal locator 26 provides a robust design for informing PDUs 20 whether they are inside or outside building 18. PDUs 20 may reverse course within portals 22 or receive only one of the inner or outer portal messages without their inside/outside status becoming improperly programmed. In the unlikely event that a PDU's inside/outside status becomes improperly programmed, the programming is corrected the next time PDU 20 passes through any portal 22 in area 10 (FIG. 1). This situation may also be corrected by requiring a sequence event of inner followed by outer (and/or vice versa) to change inside/outside status.

When task 86 determines that an interrogation is not an outer portal message, program control exits procedure 70. Nothing prevents PDU 20 from evaluating the message further to determine whether some other type of communication to PDU 20 is taking place and from responding accordingly.

Figure 8:
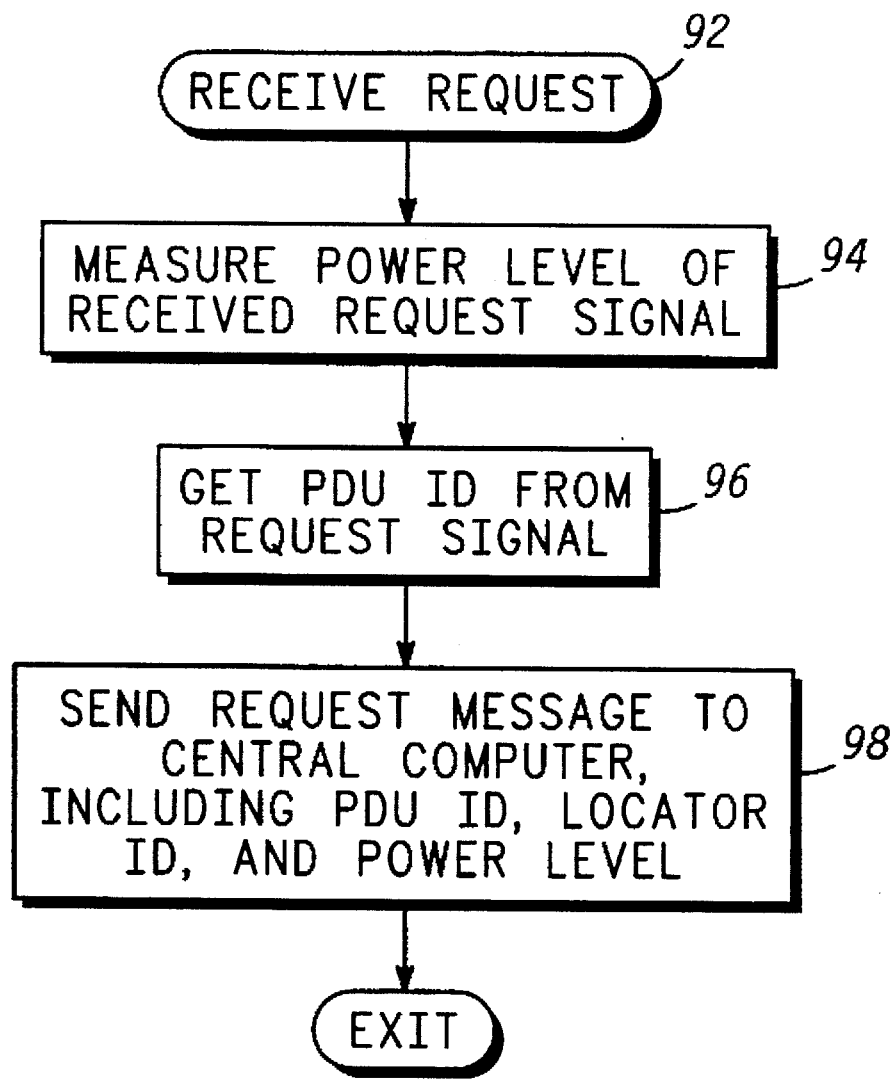
FIG. 8 is a flow chart of a receive request procedure performed by the locator unit illustrated in FIG. 5.

FIG. 8 is a flow chart of receive request procedure 92 performed by locators 14, 14' when locators 14, 14' detect a request signal transmitted from PDU 20 in response to alarm events. Substantially all outside and inside locators 14, 14' desirably perform procedures similar to procedure 92 independently from one another.

Task 94 measures the request signal power level of the signal received at locator 14, 14' via power level monitor 54 (FIG. 5). Task 96 then gets the PDU ID conveyed by the request signal/type of request, and task 98 sends the request message on to central computer 16 (FIG. 1) via modem 42. This request message includes the measured power level, the PDU ID/type of request, and the ID of the locator 14 or 14' sending the message. Program control then exits procedure 92. Several of locators 14, 14' may receive the request signal and each measures received signal power levels and sends request messages to computer 16.

Although not specifically shown, inner or outer portal locators 24, 26 (FIG. 3) may optionally operate in a manner similar to locators 14, 14' with regard to procedure 92. If locators 24, 26 are configured to include receivers 48 and modems 42 (FIG. 5), they may detect passage messages, discussed above in connection with tasks 84 and 90 (FIG. 7), and pass these messages along with portal locator IDs to central computer 16. Desirably, portal locators 24, 26 do not make power level measurements to simplify portal locators 24, 26.

Figure 9:
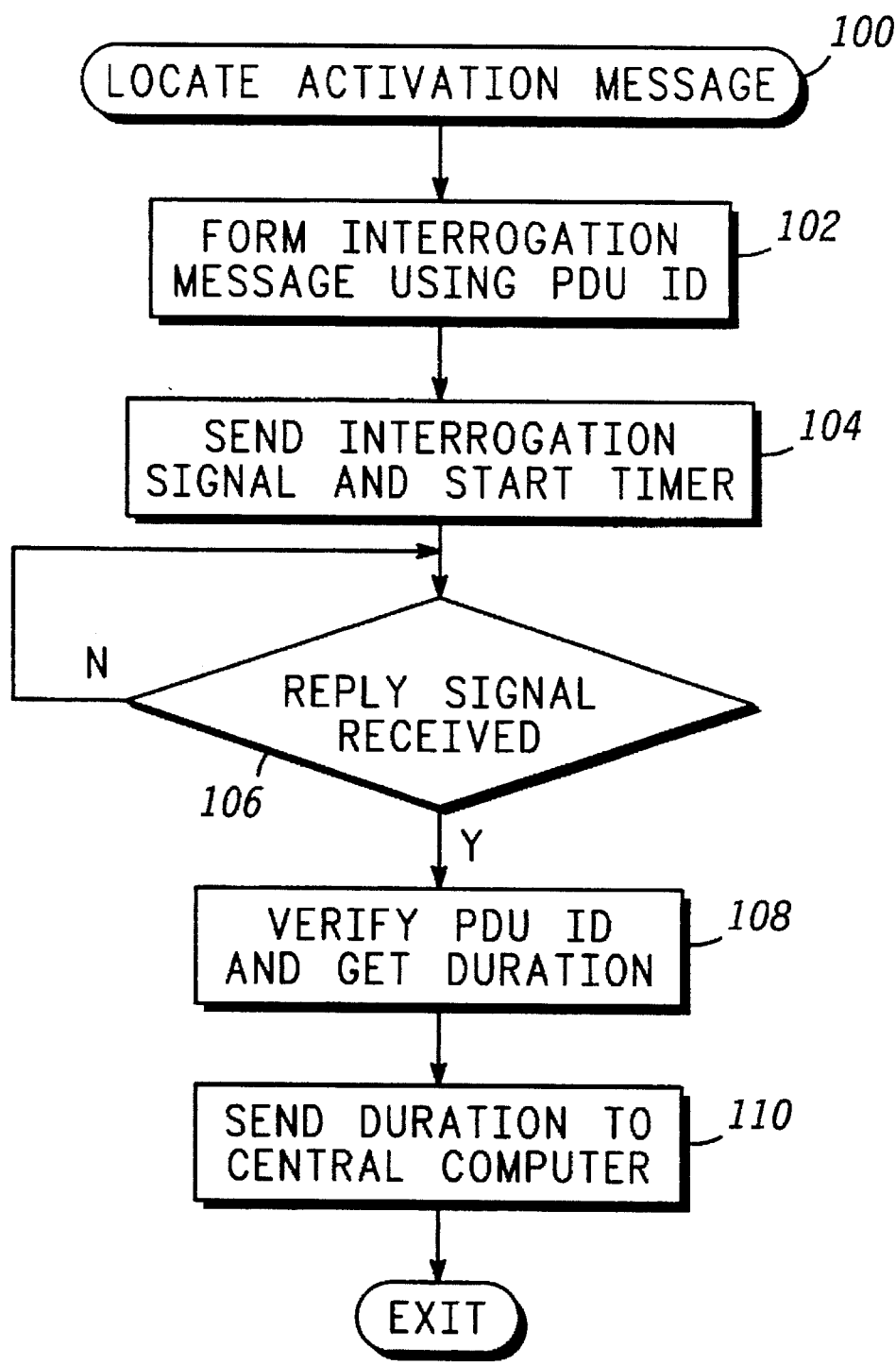
FIG. 9 is a flow chart of a locate activation message procedure performed by the locator unit illustrated in FIG. 5.

FIG. 9 is a flow chart of optional locate activation message procedure 100 performed by outside locator unit to measure the propagation delay associated with RF signals propagating between locator 14 and PDU 20. Nothing prohibits inside locator units 14' from performing procedure 100 if they include the proper components.

Substantially all outside locators 14 in system 12 (FIG. 1) perform a procedure similar to procedure 100 when locator 14 receives a locate activation message, including the ID of the PDU 20 to be localized, from central computer 16 via modem 42 (FIG. 5), activating a multilateration-compatible process providing results used by computer 16 to localize PDU 20. The circumstances under which this message is sent are discussed below (see FIG. 10 and associated text).

Procedure 100 performs task 102 to form an interrogation message conveying the ID of the PDU 20 to which the message is directed. Task 104 then transmits the message in an interrogation signal. A stop watch timer in timer circuit 50 (FIG. 5) is triggered when the interrogation signal is sent. The addressed PDU 20 responds to the interrogation signal by transmitting the reply signal (see FIG. 7 and associated text).

Query task 106 then determines whether the reply signal has been received yet at locator 14. Program control remains at task 106 until the reply signal is received. Of course, appropriate error routines (not shown) may be included to detect when PDU 20 fails to respond altogether and to take an appropriate action.

When the reply signal is received, the stop watch timer (FIG. 5) started in task 104 is stopped and task 108 verifies the PDU ID of responding PDU 20 and gets the duration measured by the stop watch timer. Task 110 sends this duration to central computer 16, along with identifying information, e.g., IDs of PDU 20 and locator 14. Program control then exits procedure 100. Central computer 16 compiles this duration with similar data gathered from other locators 14' to locate PDU 20.

Figure 10:
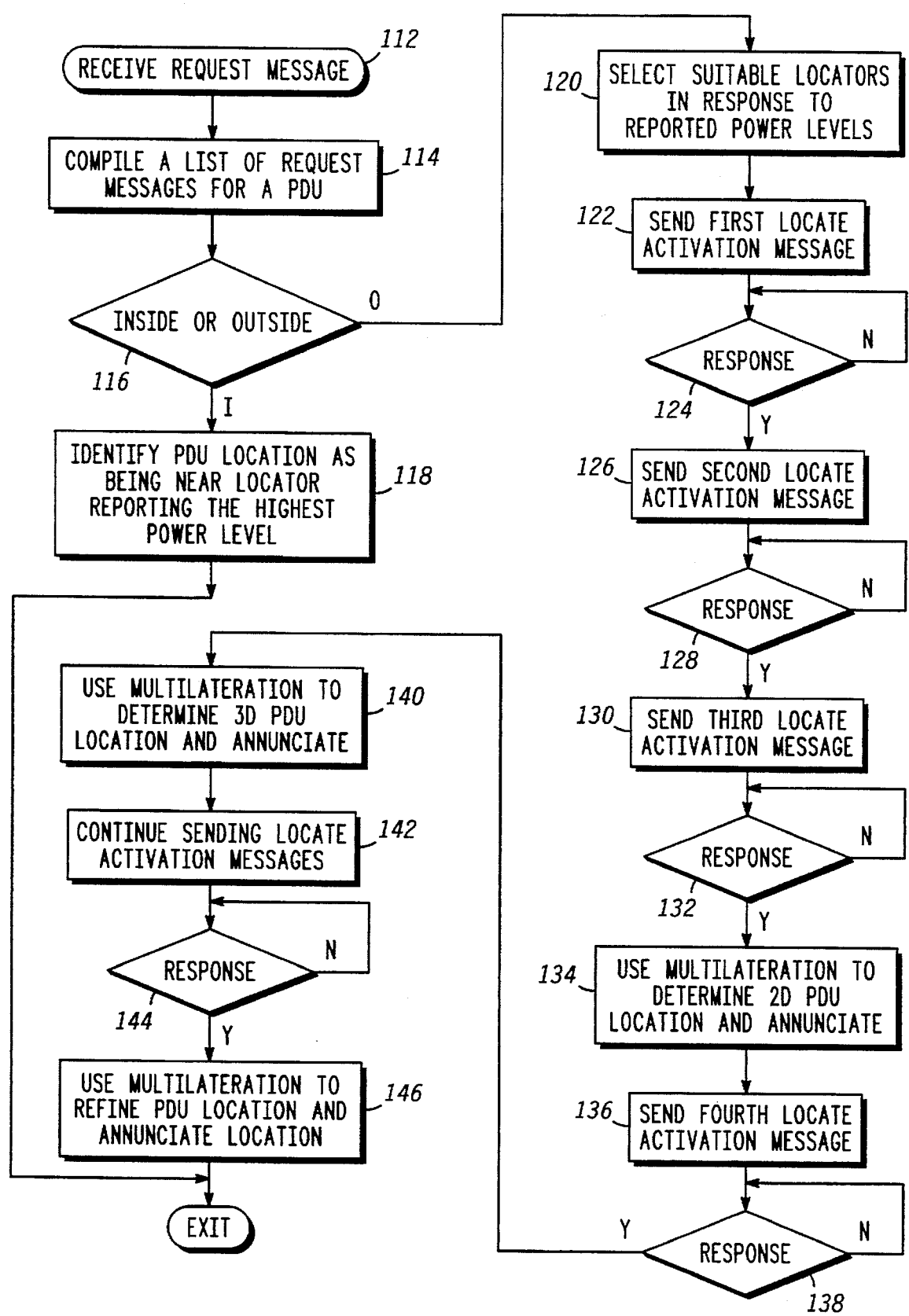
FIG. 10 is a flow chart of a receive request message procedure performed by a central computer.

FIG. 10 is a flow chart of receive request message procedure 112 performed by central computer 16 when computer 16 receives a request message from locator 14, 14'. Central computer 16 may receive several such messages from different locators 14, 14' for each PDU request signal.

Portal locators 24, 26 send passage messages to central computer 16 which may simply be stored in a data base within computer 16 for later access.

Procedure 112 performs task 114 to compile a list of request messages being received for any given PDU 20. Task 114 may allow the list to compile for a few seconds before proceeding. Query task 116 then examines IDs of locators 14, 14' to determine whether predominantly inside locators 14' are sending the messages, and, if so, task 118 identifies the PDU location as being near that locator 14' reporting the highest power level. Locators 14, 14' reside at known locations and the location of locator 14' reporting the highest power level may be determined by consulting a data base (not shown) in computer 16. Task 118 may also take actions (e.g., displaying information on a video display, sounding alarms, flashing lights, printing reports, automatically placing calls to mobile radio or phone numbers) to annunciate the alarm and/or location. Security, medical or other personnel may then respond to the alarm.

Flashing lights and alarms are desirably distributed around area 10 (FIG. 1) and are coupled to computer 16 through a low speed data communication network provided by power lines. Alarm announcement may be accompanied by activating a flashing light or audible alarm near the location determined in task 118 for PDU 20. Program control then exits procedure 112. Nothing prevents computer 16 from re-initiating procedure 112 at a later time, either for the same or another PDU 20.

When task 116 determines that request messages are being received from outside locators 14, task 120 selects a suitable set of locators 14 from those sending request messages to computer 16. Task 120 generally selects at least three or four of locators 14 reporting the highest power levels. Three locators 14 may be used to localize the alarming PDU 20 in two dimensions while four locators 14 may be used to localize the alarming PDU 20 in three dimensions. These selected locators 14 usefully reside nearer to alarming PDU 20 than other locators and are best suited for use in a multilateration process.

Task 120 may also examine relative positions of selected locators 14 to verify that a suitable geometry exists for performing a multilateration process. Task 120 may determine that two selected locators 14 reside on one side of area 10 (FIG. 1) while a third selected locator 14 resides on the far side of area 10. Task 120 may desirably reject locator 14 on the far side of area 10 and select another locator 14. When procedure 112 is localizing the alarming PDU 20 in three dimensions, task 120 may reject some initially selected locators 14 in favor of others, providing a desirable mix of elevated or vertical positions for locators 14.

After task 120 has selected a set of locators 14 to use in localizing the alarming PDU 20, task 122 sends a first locate activation message to first locator 14 from this set. Program control then waits at query task 124 until the first locator 14 responds with its duration message, which measures the duration between interrogation signal transmission and reply signal receipt (see FIG. 9 and associated text). This duration is returned to computer 16, the duration information from the response is saved and program control proceeds to tasks 126–132.

Tasks 126, 128 repeat tasks 122, 124, respectively, for a second locator 14 from the set of locators selected above in task 120. Tasks 130, 132 repeat tasks 122, 124, respectively, for a third locator 14 from the set of locators selected above in task 120. After task 132 receives the third locator 14 duration response, task 134 performs a multilateration process to localize PDU 20.

Known multilateration localization processes are acceptable for use in task 134. The RF interrogation and reply signals used to measure the duration travel at the speed of light. After subtracting the constant reply delay imposed by PDU 20 (see task 76, FIG. 7 and associated text), the resulting duration represents round trip time between locator 14 and PDU 20 for an RF signal, which is converted into a distance separating PDU 20 and locator 14. When distances from three different locators 14 having known locations are obtained, trigonometric principles may be applied to identify a two-dimensional location for the alarming PDU 20. Task 134 may annunciate the location for PDU 20 (analogous to task 118).

Even though a location for the alarming PDU 20 has been determined at task 134, process 112 need not then stop localizing PDU 20. Tasks 136, 138 may optionally repeat tasks 122, 124, respectively, for a fourth locator 14. Task 140 then usefully repeats task 134 using four durations to obtain a three-dimensional location. After task 140, tasks 142, 144, 146 continue sending location activation messages, waiting for responses and performing multilateration processes, respectively, to refine the location determined for PDU 20. Tasks 142, 144, 146 may rely upon durations determined from the same locators 14 used previously or they may rely upon durations determined from locators 14 not originally selected above in task 120. After task 146, program control exits procedure 112. Nothing prevents procedure 112 from being executed again later with respect to this or another PDU 20. Procedure 112 may be executed again later, e.g., in a few minutes, with respect to the same PDU 20 without the same PDU 20 first sending out a request signal to verify PDU location.

Selection and sequential activation of appropriate locators 14 for use in a multilateration process frees locators 14 and system 12 (FIG. 1) from operating upon a common time base. Each locator 14 merely measures durations using its own time base. Accordingly, precise synchronization is not needed, and networking and installation complexity are reduced.

In summary, the present invention provides an improved personal alarm system and method using RF signals for communication and location purposes. The RF signals do not suffer from the short range, false alarm and false silence limitations of infrared and ultrasonic signals. While multilateration is used to localize an alarming PDU, precise synchronization among locator units is not required. One embodiment permits in-building locators to include a simplified assortment of components for reduced complexity and increased robustness. PDUs alter their transmissions in response to whether they are inside or outside a building. When inside a building, PDUs may transmit at low power to limit the range over which request signals are received. An alarming PDU's location may be determined by associating power levels with the identity of locators receiving the signals.

Changes and modifications may be made in the preferred embodiments without departing from the scope of the present invention. The inside locators described herein may be eliminated so that the system relies only upon locators similar to the outside locators described herein. Some such outside locators may be placed in buildings and locators may desirably be distributed in elevation to enhance system ability to determine three-dimensional PDU locations. The central computer may be eliminated and its functions distributed among the locators. Additional devices, e.g., portable locators, may be employed in the system of the present invention to localize alarming PDUs to exacting precision.

These and other changes and modifications which are obvious to those skilled in the art are intended to be included within the scope of the present invention.

What is claimed is:

1. In a personal alarm location system having a plurality of locator units positioned at fixed positions and having a population of locatable units, a method of locating one of said locatable units, said method comprising steps of:

transmitting a request signal from said one locatable unit;

receiving said request signal at a first group of said plurality of locator units;

measuring a power level for said request signal at each of said first group of locator units;

selecting a portion of said group of locator units in response to said power levels obtained in said measuring step; and activating said selected portion of locator units to determine a position for said locatable unit.

2. A method as claimed in claim 1, wherein said activating step comprises a step of using multilateration to determine said position for said locatable unit.

3. A method as claimed in claim 1, wherein said activating step comprises a step of sequentially determining a distance between each of said portion of locator units and said locatable unit.

4. A method as claimed in claim 1, wherein said activating step comprises, for each of said selected portion of locator units, steps of:

sending an interrogation signal;

detecting a reply signal; and measuring a duration between said sending and detecting steps.

5. A method as claimed in claim 4, wherein:

each of first, second, and third ones of said portion of said locator units performs said sending, detecting, and measuring steps; and said second locator unit performs said sending, detecting and measuring steps after said first locator unit has performed said sending, detecting and measuring steps and before said third locator unit performs said sending, detecting and measuring steps.

6. A method as claimed in claim 4, wherein:

said transmitting step comprises a step of communicating a locatable unit identification code with said request signal; and said sending step comprises a step of communicating said identification code with said interrogation signal to instruct only said one locatable unit to respond by transmitting said reply signal.

7. A method as claimed in claim 4, wherein said request signal, said interrogation signal and said reply signal are radio frequency (RF) signals.

8. A method as claimed in claim 1, wherein said transmitting step comprises steps of:

communicating a locatable unit identification code with said request signal; and configuring said request signal to include a plurality of bursts, wherein each of said bursts conveys said identification code and said bursts are delayed from one another.

9. A method as claimed in claim 8, wherein said bursts are delayed from one another by a duration that randomly varies between bursts.

10. A method as claimed in claim 1, additionally comprising steps of:

placing a first set of said locator units proximate a ground level; and placing a second set of said locator units at elevated positions relative to said ground level.

11. A method as claimed in claim 1, wherein:

said plurality of locator units includes a set of inside locator units and a set of outside locator units, said inside locator units residing at fixed positions within a building, said outside locator units residing at fixed positions outside of building structures;

said activating step is performed when said first group of locator units are included in said set of outside locator units; and said method additionally comprises a step of determining, when said first group of locator units are included in said set of inside locator units, a position for said locatable unit in response to power levels obtained in said measuring step without performing said activating step.

12. A method as claimed in claim 11, additionally comprising steps of:

identifying, prior to said transmitting step, whether said locatable unit is inside or outside said building;

performing said transmitting step at a first power level when said locatable unit is outside said building; and performing said transmitting step at a second power level less than said first power level when said locatable unit is inside said building.

13. A method as claimed in claim 12, wherein said identifying step comprises steps of:

positioning outer and inner portals so that said locatable unit goes through both of said outer and inner portals to enter or exit said building;

transmitting a first universal interrogation signal from said outer portal and a second universal interrogation signal from said inner portal;

detecting said first and second universal interrogation signals at said locatable unit; and adjusting a transmission power level parameter for said locatable unit in response to a relative sequence over which said first and second universal interrogation signals are detected by said locatable unit.

14. A method of operating a locatable unit in accordance with a personal alarm location system having a plurality of locator units positioned at fixed locations, said method comprising steps of:

detecting an activation event;

transmitting a request signal in response to said activation event;

receiving a first interrogation signal;

sending a first reply signal in response to said first interrogation signal, said reply signal being sent approximately a constant predetermined duration following said receiving step;

receiving a second interrogation signal following said step of sending a first reply signal; and sending a second reply signal in response to said second interrogation signal said second reply signal being sent approximately said constant predetermined duration following said second interrogation signal receiving step.

15. A method as claimed in claim 14, additionally comprising steps of:

receiving a third interrogation signal following said step of sending a second reply signal; and sending a third reply signal in response to said third interrogation signal, said third reply signal being sent approximately said constant predetermined duration following said step of receiving a third interrogation signal.

16. A method as claimed in claim 15, additionally comprising steps of:

receiving a fourth interrogation signal following said step of sending a third reply signal; and sending a fourth reply signal in response to said fourth interrogation signal, said fourth reply signal being sent approximately said constant predetermined duration following said step of receiving a fourth interrogation signal.

17. A method as claimed in claim 16, additionally comprising steps of:

receiving a fifth interrogation signal following said step of sending a fourth reply signal; and sending a fifth reply signal in response to said fifth interrogation signal, said fifth reply signal being sent approximately said constant predetermined duration following said step of receiving a fifth interrogation signal.

18. A method as claimed in claim 14, wherein:

said transmitting step comprises a step of communicating a locatable unit identification code through said request signal; and said receiving step comprises a step of obtaining said identification code from said first interrogation signal.

19. A method as claimed in claim 14, wherein said request signal, said interrogation signal and said reply signal are radio frequency (RF) signals.

20. A method as claimed in claim 14, wherein said transmitting step comprises steps of:

communicating a locatable unit identification code with said request signal; and configuring said request signal to include a plurality of bursts, wherein each of said bursts conveys said identification code and said bursts are delayed from one another.

21. A method as claimed in claim 20, wherein said bursts are delayed from one another by a duration that randomly varies between bursts.

22. A method as claimed in claim 14, additionally comprising steps of:

identifying, prior to said transmitting step, whether said locatable unit is inside or outside a building;

performing said transmitting step at a first power level when said locatable unit is outside said building; and performing said transmitting step at a second power level less than said first power level when said locatable unit is inside said building.

23. A method as claimed in claim 14, wherein said locatable unit has an activation switch, and said detecting step comprises a step of responding to said activation switch.

24. A personal alarm location system operable over a predetermined area, said personal alarm system comprising:

at least one locatable unit positioned in said area, said locatable unit being configured to transmit request and reply signals and to receive an interrogation signal;

a plurality of locator units positioned at known places within said area, wherein each locator unit is configured to receive said request signal and said reply signal, to detect a power level at which said request signal is received, to send said interrogation signal and to measure the duration between the sending of said interrogation signal and the detecting of said reply signal; and a central controller in data communication with each of said locator units, said central controller being configured to instruct selected ones of said locator units to send said interrogation signal, said selected ones of said locator units being selected in response to request signal power levels detected at said selected ones of said locator units.

25. A system as claimed in claim 24, wherein said central controller is further configured so that said selected ones of said locator units are sequentially instructed to send said interrogation signal and so that durations between the sending of said interrogation signal and the detecting of said reply signal for each of said locator units may be converted into a location for said locatable unit.

26. A system as claimed in claim 24 wherein said locatable and locator units are configured so that said request, interrogation, and reply signals are radio frequency signals.

27. A system as claimed in claim 24, wherein:

said plurality of locator units are placed at fixed positions which are outside a building;

said system additionally comprises a plurality of inside locator units which reside at fixed locations inside said building and are in data communication with said central controller, said inside locator units configured to detect said power level at which said request signal is received; and said central controller is further configured to determine a position for said locatable unit in response to power levels detected at said selected ones of said inside locator units.

28. A system as claimed in claim 27, wherein said locatable unit is further configured to identify whether said locatable unit is inside or outside said building, to transmit said request signal at a first power level when said locatable unit is outside said building, and to transmit said request signal at a second power level, said second power level being less than said first power level, when said locatable unit is inside said building.

29. A system as claimed in claim 28, additionally comprising outer and inner portals positioned so that said locatable unit goes through both said outer and inner portals to enter or exit said building.

30. A system as claimed in claim 24, wherein a first set of said locator units are placed proximate a ground level and a second set of said locator units are placed at elevated positions relative to said ground level.

* * * * *